Oct. 18, 1966  M. J. LAVERTY  3,279,052
HERMETIC SEALING METHOD AND APPARATUS
Filed Oct. 31, 1963  2 Sheets-Sheet 1

BY *[signature]*

ATTORNEYS

Oct. 18, 1966   M. J. LAVERTY   3,279,052
HERMETIC SEALING METHOD AND APPARATUS
Filed Oct. 31, 1963   2 Sheets-Sheet 2
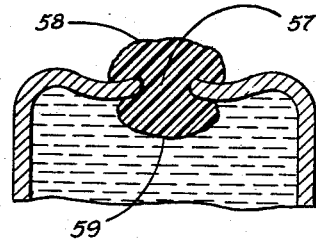
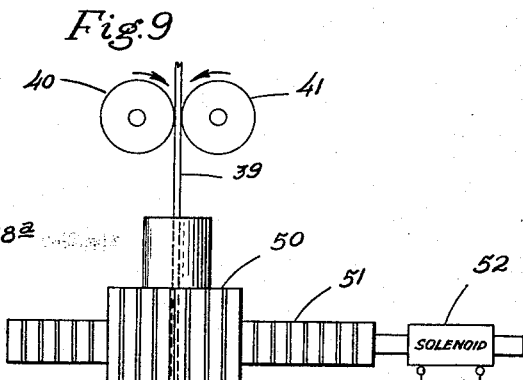
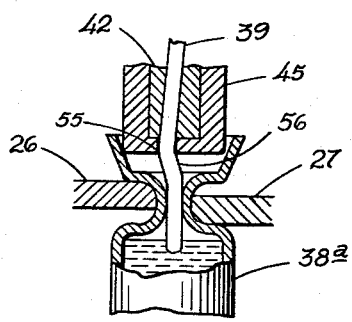
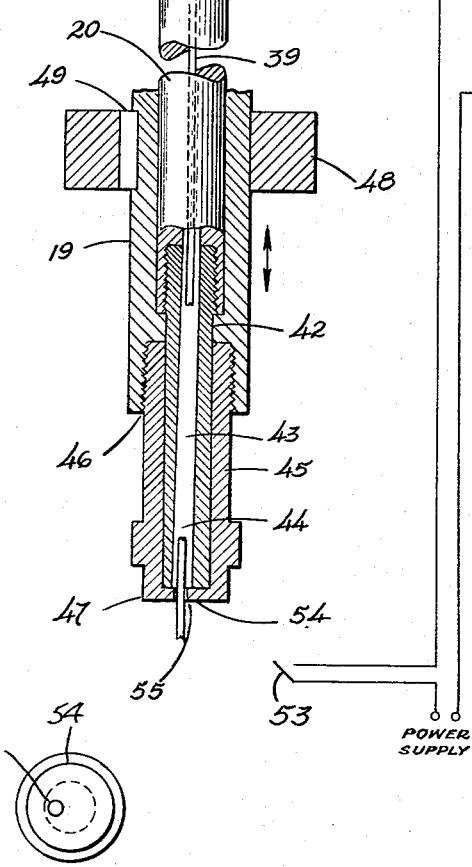
BY *[signature]*
ATTORNEYS

United States Patent Office 3,279,052
Patented Oct. 18, 1966

3,279,052
HERMETIC SEALING METHOD AND APPARATUS
Martin J. Laverty, Jericho, N.Y., assignor to Murray Manufacturing Corporation, Brooklyn, N.Y., a corporation of New York
Filed Oct. 31, 1963, Ser. No. 320,312
5 Claims. (Cl. 29—516)

This invention relates to the production of fluid-tight tubular members, such as used in magnetic circuit breakers and, in particular, to a method and apparatus for hermetically sealing a fluid confined within a tube.

In U.S. Patent No. 3,090,263, a method and apparatus are disclosed for sealing an open end of a deformable metallic member or tube comprising a cylindrical wall, the sealed end being mechanically formed by a spinning tool so that structurally the metal forming the closed end wall extends radially inwardly and is caused to cohere together at the axial center of the tubular member.

The tubular member utilized in a circuit breaker comprises a non-magnetic thin wall tube of preferably, although not necessarily, brass or copper closed at one end and a magnetic flange, or pole piece, attached to that end. In the initial stages of manufacture, the other end is open and through it a movable magnetic core and a liquid are inserted, the open end being then mechanically sealed by means of a spinning tool. The manner in which the sealed tube is used in constructing a magnetic circuit breaker is adequately described in the aforementioned patent and need not be discussed here.

It is essential, however, for efficient operation of the circuit breaker that the tube retain the liquid without leaking. Attempts to use solder joints have not been successful for the reason that solder joints are often defective and result in a large number of rejects; defective joints are difficult to repair; and generally the heat necesary for soldering causes expansion and vaporization of the liquid in the tube which produces internal pressure sufficient to cause the liquid and/or gases to bubble through the molten solder and prevent the formation of an hermetically sealed joint.

Thus far, the method and apparatus for mechanically forming the closed joint described in U.S. Patent 3,090,263 have given the most desirable result. As stated hereinbefore, the aforementioned method causes the metal deformed radially inwardly by the spinning tool to cohere together. The joint is in effect a cold weld and so long as a complete weld is obtained, an hermetic seal is assured. However, this may not always occur in situations where the quality of the metal surface being deformed is such as to interfere with the formation of an adequate weld. Thus, while a mechanically produced joint may appear adequate by inspection, it may part or open slightly due to expansion and contraction of the tube during use.

It is therefore an object of this invention to provide an improved method and apparatus for mechanical shaping or forming of the open end of a tube into an hermetically sealed joint.

Another object is to provide a tube, one end of which is closed by a mechanically formed joint, having the property of resisting the tendency of stress arising from expansion and contraction of the tube from opening the joint.

These and other objects will more clearly appear from the following description taken together with the accompanying drawings, wherein:

FIGS. 2 to 6 show a deformable tubular member in its various stages of production;

FIGS. 7 and 8 are sectional elevational views of the forming rollers showing different stages of the forming operation;

FIG. 9 is a more detailed view of a portion of FIG. 1 showing the structural relationship of the feed and cut-off tube to the pilot tube and the means for rotating the cut-off and feed tube; and FIG. 10 is a bottom view of the cut-off collet employed in conjunction with the pilot tube nipple.

In carrying out my invention, I provide a method for mechanically sealing the open end of a deformable metal tubular member which comprises, axially feeding a cord or filament of elastomeric material, such as a material known in the trade as neoprene (polymerized chloroprene), into the open end of the tubular member, axially supporting the cord of elastomeric material within the opening of the tubular member while applying a spinning force against the periphery of the member near the open end to deform the wall thereof radially inwardly against the axially supported cord, severing the cord of elastomeric material just above the tubular member, and continuing the application of the spinning force to form an end wall by deforming the metal against the cord of elastomeric material to elastically compress the cord into a narrow neck portion and form a pair of beads oppositely disposed on each side of the end wall elastically connected together under tension through said narrow neck portion.

Thus, I provide as a product an hermetically sealed metal tube having a top and bottom, the bottom comprising an end wall integral with the peripheral wall of the tube, the top also comprising an end wall deformed radially inwardly against an axially mounted seal of elastomeric material, the seal being necked at its axial mounting and terminating on each side of the mechanically formed end wall into a pair of enlarged beads, each held against the inner and outer surface of the end wall as stated above by the elastic tension exerted through the neck of the seal.

In producing the novel seal of my invention, I employ an apparatus for sealing the open end of a tube comprising in combination means for fixably clamping the tube at an end opposite the open end, means for axially guiding and supporting a cord of elastomeric material into the opening of said tubing, and means for peripherally applying a spinning force-applying tool to deform the wall of said tubing at the open end and form an end wall projecting radially inwardly against and in sealing engagement with the axially supported elastomeric material.

Figure 1:
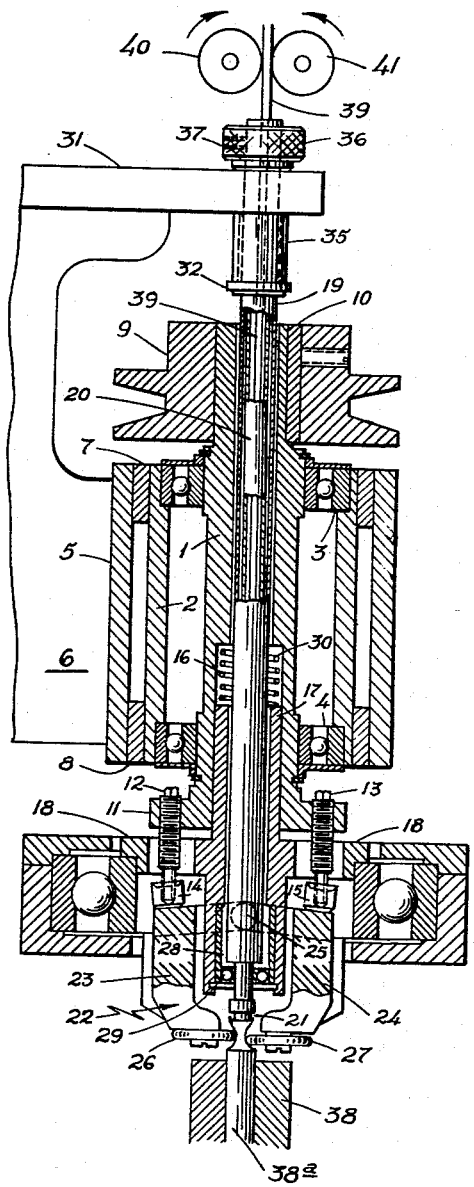
FIG. 1 is a side view, partly in cross section, of a preferred embodiment of a spin-forming apparatus employed in producing a mechanically formed joint.

The preferred apparatus employed in carrying out the invention is an improved modification of an embodiment described in U.S. Patent No. 3,090,263. Such apparatus is depicted in FIG. 1 herein and comprises a rotatable shaft 1 supported in a housing 2 by ball bearing assemblies 3, 4. The housing 2 is slidably attached to a tubular bracket 5 secured to a post 6 by means of collar bearings 7, 8. The shaft 1 is driven by a pulley 9 splined thereto by key 10.

The lower end of the shaft 1 terminates in a flange 11 which carries a pair of diametrically disposed pins 12, 13. The pins have mounted at the lower end thereof swivel mounted shoes 14, 15, respectively.

The shaft is counterbored at 16 to accommodate a shaft 17 slidably mounted in the space provided by the counterbore. The shaft 17 includes a radial extension at 18 which bears on thrust bearings (not shown) and is rotated together with the shaft 1 as a result of pins 12, 13 passing through aligned holes in the extension 18. The aligned centers of the shafts 1 and 17 are hollowed to provide space for a non-rotatable shaft or pilot tube 19 having a hollow feed and cut tube 20 passing therethrough and nose 21 at one end of shaft 19 for supporting the tubular member being sealed. Additional structural details of the feed and cut-off tube hidden from view are shown in FIG. 9 to be described later.

The lower end of shaft 17 supports a spin-forming head generally indicated at 22, comprising a pair of oppositely disposed C-shaped forming members 23, 24, pivotally mounted to the shaft 17 by a pin 25. The forming members carry rollers 26, 27, respectively, which bear against the periphery of the tube being sealed.

As shown in FIG. 1, the lower end of the shaft 17 is counterbored at 28 to accommodate ball bearing assembly 29 which supports and permits rotation of shaft 17 therearound.

A spring 30 is mounted in the space between the shafts 1 and 17 to provide some resiliency in the axial direction between the two shafts, whereby when the swivel shoes 14, 15 are brought to bear against the C-shaped members 23, 24 of the spinning head, the force of impact is, to a large extent, absorbed by the spring 30. Non-rotatable pilot tube 19 is independently secured to an extending portion 31 of the post 6.

Pilot tube 19 is adapted to move vertically, which movement is limited in one direction by a shoulder 32 attached to a sleeve 35 surrounding pilot tube 19 and in the other direction by a collar 36 attached by a screw 37 to the shaft.

In the initial position of the forming apparatus, the shafts 1 and 17 are raised and the tube 38a clamped in vise 38. The shafts are then gradually lowered by suitable mechanical means (not shown) and the swivel shoes are brought to bear on the opposite C-shaped members.

A cord of elastomeric material 39 is axially fed intermittently into the center of pilot tube 19 by means of friction rolls 40, 41. The cord passes through feed and cut-off tube 20 and through nose 21 into the open end of tube 38a.

In operation, the centrifugal force produced by the rotation of the spinning head is sufficient to separate forming members 26, 27 prior to the application of force by the shoes. However, if desired, the forming members may be spring urged.

The apparatus is lowered to the desired position so that the rollers are located on opposite sides of the tube. Shaft 1 is then further lowered so that the swivel shoes 14, 15 are brought to bear on the respective forming members forcing the members to move towards each other about the pivot pin 25. After the rollers have reached a predetermined position, at which the end wall has been completely fabricated, the shaft 1 is retracted, permitting the rollers to move outwardly away from the tube.

The manner in which the cord of elastomeric material is fed into open tubular member 38a and then severed will be apparent from FIG. 9 which is an enlarged and more detailed rendition of the elements not clearly shown or hidden from view in FIG. 1. A portion of feed and cut-off tube 20 is depicted having threaded into its lower end a hollow guide extension 42, the passageway 43 of which is slightly axially offset at its end 44. The guide extension passes through pilot tube nipple 45 which is threaded to pilot tube 19 at 46 and to flaring tool 47 at the other end. Pilot tube 19 does not rotate but is adapted for up and down movement through bushing 48 fixed within a stationary support, the tube 19 being prevented from rotating by means of key 49 in bushing 48. Feed and cut-off tube 20 which extends to the top of the apparatus shown in FIG. 1 has coaxially mounted on it a pinion 50 in cooperating relationship with a toothed rack 51 which is driven by a solenoid 52 which is actuated by a micro-switch 53 located near one of the forming members 23, 24, the micro-switch being tripped at about the end of the forming operation to cause rack 52 to rotate pinion 50 and hence feed tube 20 and its extension 42 to effect severing of cord 39. The severing of the cord is achieved as extension 42 rotates within pilot tube nipple 45 which has a cut-off collet 54 with an opening 55 through which the cord passes. Since the exit end of passageway 43 is eccentrically located relative to the axis of rotation of the feed tube 20 (note FIG. 10), the cord is sheared during rotation of feed extension 42. This occurs when cord 39 has been axially supported in the opening of tubular member 38a and after forming members have reached approximately the end of the forming operation at which time micro-switch 53 which is disposed in the path of one of forming members 23, 24 is actuated. At the end of the severing operation, a biasing spring (not shown) associated with the solenoid returns feed extension 42 to its original position in which its exit opening lines up with that of the collet.

Figures 2, 3:
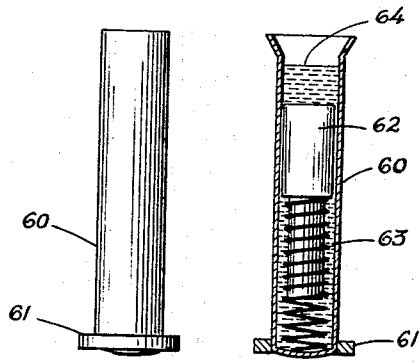
Figures 4, 5:
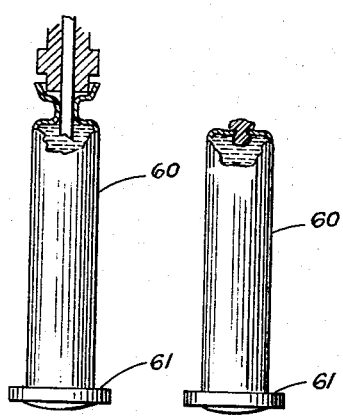

At the completion of the severing operation, shaft 1 is raised bringing with it shaft 17 and pilot tube 19. For this reason, pinion 50 is made extra wide to allow up and down movement of pilot tube 19 while still maintaining pinion 50 in meshing engagement with rack 51. The upward movement of pilot tube 19 also actuates means for actuating friction rollers 40, 41 to feed a sufficient length of cord 39 into feed tube 20 so that an extension of cord is available at the nose of flaring tool 47 for insertion into the next tubular member. Recapitulating the operation from the beginning to the end of the sealing step, shaft 1, while rotating, is lowered towards tubular member 38a fixed in vise 38. Flaring tool 47 flares the open end of tube 38a outwardly as shown in FIGS. 3 and 4. Swivel shoes 14, 15 are then caused to bear on forming members 23, 24 forcing rollers 26, 27 mounted thereon to bear against the periphery of tubular member 38a and deform the cylindrical wall inward as shown in FIG. 7 and anchor cord 39 in the neck of the deformed tube. At about this portion of the operation, one of the forming members 23, 24 contacts micro-switch 53 which actuates the solenoid 52 coupled to rack 51. The rack is caused to move and rotate pinion 50, thus causing pilot tube 20 to rotate. This causes offset portion 56 (note FIG. 7) of the cord 39 of elastomeric material to rotate during which it is severed by shearing contact with the edge of opening 55 of collet 54. The deformation of the tubular member continues as in FIG. 8 and after the rollers have reached a predetermined position, that is the cord has been necked by compression to insure an adequate seal, shaft 1 is retracted permitting the rollers to move outwardly from the tube. During this movement, the micro-switch opens and shuts off the solenoid, the rack returning to its original position by means of a biasing spring (not shown).

As described in U.S. Patent No. 3,090,263, the working rolls may be brought together sufficiently to cause the pinched metal at the top of the formed tube to be sheared off. However, in the present embodiment, as an alternative procedure, the metal need not be sheared off during deformation, since the necking of the elastomeric material generally assumes an adequate seal. The excess metal remaining after completion of the sealing operation can be removed in a subsequent operational step, it being understood, of course, that it can be done simultaneously with the completion of the deforming operation.

Upon completion of the sealing operation (note FIGS. 5, 6 and 8), the elastomeric seal generally comprises a neck portion 57 under compression by the metal deformed radially inwardly against it to form an end wall on each side of which are disposed beads 58 and 59 held against each side by elastic tension exerted through the neck portion of the seal. The position of feed extension 42 will be noted in FIG. 8 at the moment of severing, the passageway 43 moving eccentrically away from opening 55 of collet 54.

While neoprene has been given as illustrative of one of the elastomeric materials that can be used in carrying out the invention, it will be appreciated that other elastomeric materials may be used. Examples of elastomeric materials include natural rubber, and such synthetic materials as Teflon (polytetrafluoroethylene), and others.

As illustrative of one product produced in accordance with the invention, reference is made to FIGS. 2 to 5 and, in particular to FIG. 3. FIG. 3 shows an assembly of parts for use in circuit breakers comprising tubular member 60 having a pole piece 61 attached at one end and a movable pole piece 62 within the tube urged away from end pole piece 61 by a spring 63, the tube being filled with a liquid 64 of suitable viscosity.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of sealing an open end of a deformable metal tubular member which comprises, axially feeding a cord of elastomeric material into the open end of said tubular member, axially supporting a portion of said elastomeric material within the opening of said tubular member while peripherally applying a spinning force near said open end to deform the wall of said tubing radially inwardly against the axially supported elastomeric material, and continuing the application of said spinning force to form an end wall by compression of said metal against said elastomeric material whereby to form a narrow neck portion on said axially supported elastomeric material and a pair of beads of said material oppositely disposed on each side of the formed end wall, said beads being held against the end wall by elastic tension exerted through said narrow neck portion.

2. A method of sealing an open end of a deformable metal tubular member which comprises, axially feeding a cord of elastomeric material into the open end of said tubular member, axially supporting a portion of said elastomeric material within the opening of said tubular member while peripherally applying a spinning force near said open end to deform the wall of said tubing radially inwardly against the axially supported elastomeric material, severing said cord near the axial support, and continuing the application of said spinning force to form an end wall by compression of said metal against said elastomeric material whereby to form a narrow neck portion on said axially supported elastomeric material and a pair of beads of said material oppositely disposed on each side of the formed end wall, said beads being held against the end wall by elastic tension exerted through said narrow neck portion.

3. An apparatus for sealing an open end of a tubing which comprises, means for fixably clamping the tubing at an end opposite the open end, means for axially guiding and supporting a cord of elastomeric material into the opening of said tubing, and means for peripherally applying a spinning force-applying tool to deform the wall of said tubing and form an end wall radially inward against and in sealing engagement with said axially supported elastomeric material whereby to compress said elastomeric material into a narrow neck portion terminating at each end thereof into a pair of beads oppositely disposed on each side of said deformed end wall, said beads being under elastic tension through said narrow neck portion.

4. An apparatus for sealing an open end of a tubing which comprises, means for fixably clamping the tubing at an end opposite the open end, means for axially guiding and supporting a cord of elastomeric material into the opening of said tubing, means for severing said cord at the opening of said tubing, and means for peripherally applying a spinning force-applying tool to deform the wall of said tubing and form an end wall radially inward against and in sealing engagement with said axially supported elastomeric material whereby to compress said elastomeric material into a narrow neck portion terminating at each end thereof into a pair of beads oppositely disposed on each side of said deformed end wall, said beads being under elastic tension through said narrow neck portion.

5. An apparatus for sealing an open end of a tubing which comprises, means for fixably clamping the tubing at an end opposite the open end, a hollow rotatable feed and cutoff shaft for axially guiding and supporting a cord of elastomeric material into the opening of said tubing, a hollow non-rotatable shaft surrounding said rotatable shaft, a nipple fastened to the end of said non-rotatable shaft, said nipple having at its unfastened end a collet with an opening therein to permit said cord to pass therethrough and by means of which said cord is severed, a hollow extension fastened to said hollow rotatable shaft and rotatably disposed within said nipple, the hollow passageway in said extension being slightly axially offset, means for rotating said rotatable shaft to effect cutting of said cord, means for peripherally applying a spinning force-applying tool to deform the wall of said tubing and form an end wall radially inward against and in sealing engagement with said axially supported elastomeric material whereby to compress said elastomeric material into a narrow neck portion terminating at each end thereof into a pair of beads oppositely disposed on each side of said deformed end wall, said beads being under elastic tension through said narrow neck portion.

References Cited by the Examiner

UNITED STATES PATENTS

| | | | |
|---|---|---|---|
| 804,321 | 11/1905 | Hoxie | 83—199 |
| 1,625,795 | 4/1927 | Crawford | 29—516 |
| 1,754,178 | 4/1930 | Muir | 29—422 |
| 3,090,263 | 5/1963 | Laverty | 72—71 |

CHARLES W. LANHAM, *Primary Examiner.*

G. P. CROSBY, *Assistant Examiner.*